(12) United States Patent
Zangooie et al.

(10) Patent No.: US 7,478,019 B2
(45) Date of Patent: Jan. 13, 2009

(54) MULTIPLE TOOL AND STRUCTURE ANALYSIS

(75) Inventors: Shahin Zangooie, Livermore, CA (US); Youxian Wen, Fremont, CA (US); Heath Pois, Fremont, CA (US); Jon Opsal, Livermore, CA (US)

(73) Assignee: KLA-Tencor Corporation, Milpitas, CA (US)

( * ) Notice: Subject to any disclaimer, the term of this patent is extended or adjusted under 35 U.S.C. 154(b) by 582 days.

(21) Appl. No.: 11/043,196

(22) Filed: Jan. 26, 2005

(65) Prior Publication Data

US 2006/0167651 A1 Jul. 27, 2006

(51) Int. Cl.
G06F 17/10 (2006.01)
(52) U.S. Cl. .......................................... 703/2; 702/189
(58) Field of Classification Search ................ 703/2; 356/237.2, 401, 601, 630; 702/66, 179, 189; 438/14, 680
See application file for complete search history.

(56) References Cited

U.S. PATENT DOCUMENTS

| | | | |
|---|---|---|---|
| 6,532,076 B1 | 3/2003 | Sidorowich | 356/630 |
| 6,768,967 B2 | 7/2004 | Johnson et al. | 702/179 |
| 6,781,706 B2 | 8/2004 | Sidorowich | 356/630 |
| 6,785,638 B2 * | 8/2004 | Niu et al. | 702/189 |
| 6,818,459 B2 * | 11/2004 | Wack et al. | 438/14 |
| 6,853,873 B1 | 2/2005 | Rollo et al. | 700/121 |
| 6,867,892 B2 * | 3/2005 | Akimoto | 356/340 |
| 6,919,957 B2 * | 7/2005 | Nikoonahad et al. | 356/237.2 |
| 6,928,395 B2 * | 8/2005 | Niu et al. | 702/189 |
| 6,946,394 B2 * | 9/2005 | Fielden et al. | 438/680 |
| 7,006,235 B2 * | 2/2006 | Levy et al. | 356/600 |
| 7,170,604 B2 | 1/2007 | Sezginer et al. | 356/400 |
| 2004/0032582 A1 | 2/2004 | Johnson | 356/237.2 |

FOREIGN PATENT DOCUMENTS

WO    WO 03/054475 A2    7/2003

OTHER PUBLICATIONS

Skumanich et al., A. In-Tool Process Control for Advanced Patterning Based on Integrated Metrology and Tool -Level Data Stream Analysis, IEEE Conf. and Workshop on Advanced Semiconductor Manufacturing, May 2004, pp. 291-296.*

(Continued)

Primary Examiner—Russell Frejd
(74) Attorney, Agent, or Firm—Stallman & Pollock LLP (57) ABSTRACT

Measurement data sets for optical metrology systems can be processed in parallel using Multiple Tool and Structure Analysis (MTSA). In an MTSA procedure, at least one parameter that is common to the data sets can be coupled as a global parameter. Setting this parameter as global allows a regression on each data set to contain fewer fitting parameters, making the process is less complex, requiring less processing capacity, and providing more accurate results. MTSA can analyze multiple structures measured on a single tool, or a single structure measured on separate tools. For a multiple tool recipe, a minimized regression solution can be applied back to each tool to determine whether the recipe is optimized. If the recipe does not provide accurate results for each tool, search parameters and/or spaces can be modified in an iterative manner until an optimized solution is obtained that provides acceptable solutions on each tool.

30 Claims, 4 Drawing Sheets

OTHER PUBLICATIONS

Stine et al., B. Rapid Characterization and Modeling of Pattern-Dependent Variation in Chemical-Mechanical Polishing, IEEE Transactions on Semiconductor Manufacturing, Feb. 1998, pp. 129-140.*

Chang et al., C. A Comparison of Statistical Regression and Neural Network Methods in Modeling Measurement Errors for Computer Vision Inspection Systems, Computers & Industrial Engineering, Jul. 1995, pp. 593-603.*

C.M. Herzinger et al., "Ellipsometric determination of optical constants for silicon and thermally grown silicon dioxide via a multi-sample, multi-wavelength, multi-angle investigation," *Journal of Applied Physics*, vol. 83, No. 6, Mar. 15, 1998, pp. 3323-3336.

* cited by examiner

MULTIPLE TOOL AND STRUCTURE ANALYSIS

TECHNICAL FIELD OF THE INVENTION

The present invention relates to the parallel processing of multiple data sets having at least one shared parameter, such as for sets of optical measurement data taken using different structures and/or different measurement tools.

BACKGROUND

Figure 1:
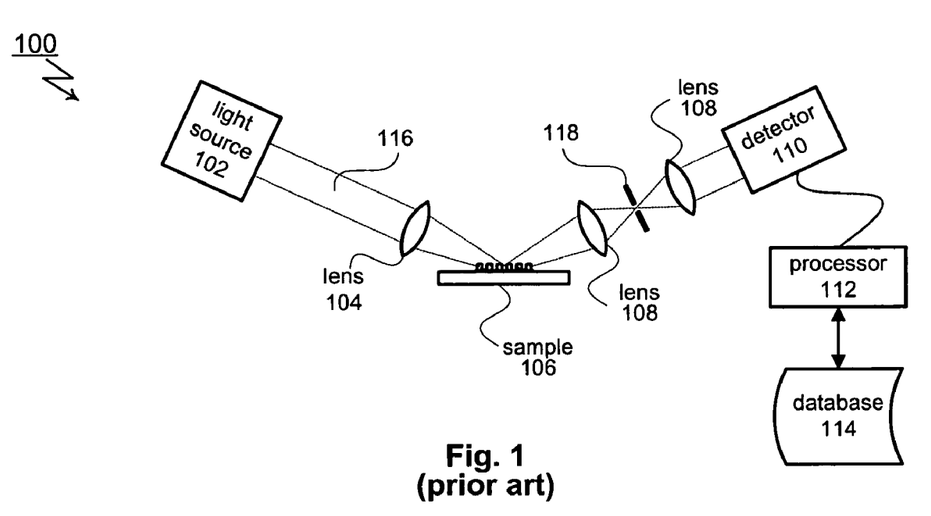
FIG. 1 is a diagram of a metrology system of the prior art.

There is a great need in industries such as the semiconductor industry for sensitive metrology equipment that can provide high resolution and non-contact evaluation capabilities, particularly as the geometries of devices in these industries continue to shrink. Manufacturers have increasingly turned to optical metrology techniques, such as ellipsometry and reflectometry, which typically operate by illuminating a sample 106 with a mono- or polychromatic probe beam 116 of electromagnetic radiation, then detecting and analyzing the reflected and/or transmitted energy such as is shown in FIG. 1. Such methods are considered essential for the efficient operation of modern fabrication facilities, particularly for semiconductor fabrication involving the formation of a stack of thin film layers on a semiconductor substrate. These non-destructive optical methods are desirable because the resultant optical data can be used to derive information regarding layer parameters, such as thickness, optical constants, and scattering, for multiple layers of a thin film stack.

The light source 102 can be any appropriate light or radiation source capable of producing a probe beam 116 of polarized or unpolarized radiation, which can include one or more wavelengths of radiation in any of the appropriate radiation bands as known in the art. A focusing element 104 can focus the probe beam to a spot on the sample 106, such that the probe beam will be reflected from, or transmitted through, the surface of the sample. A number of collection optics, which can include elements such as lenses 108 and an aperture 118, can focus the reflected or transmitted portion of the beam onto a detector 110, which can measure at least one parameter of the light, such as the intensity of the reflected or transmitted beam. Ellipsometry techniques typically measure changes in the polarization state of the probe beam after interacting with the sample, while reflectometry techniques measure changes in the magnitude of the reflected probe beam. The detector 110 can generate an output signal, in response to the measurement, which is sent to a processor to determine at least one characteristic about the sample 106. Information such as a model of the sample can be stored in a database 114 and retrieved by the processor in order to make the determination. The diffraction, or optical scattering, of the probe beam due to the structural geometry of the sample can be measured, whereby details of the structure causing the diffraction can be determined. These measurements often are made using multiple tools in the fabrication process, and each measurement can involve different structures on the semiconductor device.

These metrology techniques can be used to analyze a wide range of parameters, such as the thickness, crystallinity, composition, and refractive index of a film on a silicon wafer, as well as attributes including critical dimension (CD), line spacing, line width, wall depth, and wall profile. Various optical metrology techniques have been used to obtain these measurements during processing, including broadband spectroscopy, described in U.S. Pat. Nos. 5,607,800, 5,867,276, and 5,963,329; spectral ellipsometry, described in U.S. Pat. No. 5,739,909; single-wavelength optical scattering, described in U.S. Pat. No. 5,889,593; and spectral and single-wavelength beam profile reflectance (BPR) and beam profile ellipsometry (BPE), described in U.S. Pat. No. 6,429,943. Any of these measurement technologies, such as single-wavelength laser BPR or BPE technologies, also can be used to obtain critical dimension (CD) measurements on non-periodic structures, such as isolated lines or isolated vias and mesas. The above cited patents and patent applications, as well as PCT Application Ser. No. WO 03/009063, U.S. application 2002/0158193 (now U.S. Pat. No. 6,819,426), U.S. application 2003/0147086 (now U.S. Pat. No. 6,813,034), U.S. application 2001/0051856 A1, PCT application WO 01/55669, and PCT application Ser. No. WO 01/97280, are each hereby incorporated herein by reference.

Exemplary metrology systems use three classes of parameters and relationships. Structures on a wafer have physical parameters, such as the thickness of a layer, the widths of a line structure at various heights (measured generally perpendicular to a face of the wafer), and the complex optical index of a material. Most scatterometry measurements, for example, are performed over a range of independent parameters, which can include parameters such as wavelength, angle of incidence, and azimuth angle. Unfortunately, it is not easy to associate a correct set of theoretical parameters with data measured using these devices. Given a set of "theoretical" parameters which might correspond to the actual parameters of the stack to be evaluated, one can program a processor, using equations such as Maxwell or Fresnel equations, for example, to derive a set of theoretical data based on these theoretical parameters. The derived theoretical data can be compared to the measured data and if there is a reasonable level of correspondence, one can assume that the generated theoretical parameters fairly describe the parameters of the thin film stack under investigation. Of course, it would be highly unlikely that the first set of generated theoretical parameters and the associated derived theoretical data would provide a good match to the actual measured data. A processor can generate thousands of sets of theoretical parameters using any of a number of algorithms.

Many metrology systems use a modeling approach to analyze empirical data by relating optical measurements to a model of what is on the wafer, where the model has parameters that in some sense reflect the physical parameters on the wafer. For such an approach, a theoretical model is typically defined for each subject that will be analyzed. The theoretical model predicts the parameters that would correspond to the detected optical signal. The theoretical model is parameterized and each parameter corresponds to a physical characteristic of the sample being measured, such as line width or layer thickness. A regression is performed in which the parameters are repeatedly perturbed and the model is repeatedly evaluated to minimize the differences or residuals between the modeled results and results that are empirically obtained, referred to as "minimizing the regression." In many systems, the differences are calculated over the range of independent parameters, and an average difference, such as a squared sum, is calculated as a single difference. Various norms or other techniques are suitable for collapsing the multiple differences into a single working difference. When the residual minimization reaches some stopping criterion, the model and associated parameters are assumed to accurately reflect the subject being analyzed. One such stopping criterion is that the difference reaches some predetermined level, such as a minimum goodness-of-fit criterion. Another criterion is reached when the reduction of the difference becomes sufficiently small. In addition to residual values, confidence intervals in the model parameters and parameter correlation tables can serve as the basis for estimating the quality of the match between data calculated from a model and the experimental data, as well as for judging the validity of the model employed. A 90% confidence limit, for example, can express the sensitivity to a certain parameter, whereas the fir parameter correlation table describes the independence of the fit parameters. Other approaches are possible, such as those listed in U.S. Pat. No. 6,532,076 and U.S. Publication 2004/0032582 (now U.S. Pat. No. 6,947,135) each of which is hereby incorporated herein by reference.

Evaluation of these theoretical metrology models is a complex task, even for a relatively simple sample. As these samples become more complex, and have more parameters, the calculations become extremely time-consuming. Even with high-speed processors, real-time evaluation of these calculations can be difficult. This problem is exacerbated by the use of multiple tools in the fabrication process. Slight variations and noise differences between tools requires a regression for each tool that must account for every parameter, even if that parameter would not have changed between tools. These deficiencies are problematic in semiconductor manufacturing where it is often imperative to quickly detect processes that are not operating correctly. As the semiconductor industry moves towards integrated metrology solutions (i.e., where metrology hardware is integrated directly with process hardware) the need for rapid evaluation becomes even more acute.

For example, optical metrology systems utilizing broadband light often combine the outputs of two or more light sources or bulbs in order to obtain a probe beam with suitable broadband characteristics. For example, three lamps can be used to generate a probe beam that spans a wavelength range from about 185 nm to about 900 nm. A tungsten lamp is often used due to the associated output range from the visible to near infrared spectrum, a deuterium bulb is often used for the associated deep ultraviolet (DUV) output, and a xenon bulb is often used for the associated deep ultraviolet to near infrared output spectrum. One problem with using multiple light sources is that it can be difficult to account for slight variations in the beams produced from each source, such as the azimuth angle at which each beam is incident upon the sample being measured. Slight variations in azimuth angle can affect the measured values, such that each azimuth angle must be separately determined and accounted for in the measurement. Further, when the sample being processed is moved to another tool, the azimuth angle for each tool will be slightly different even if the same types and arrangements of light sources are used. These differences must again be accounted for in the measurement of sample parameters.

A number of approaches have been developed to overcome the calculation bottleneck associated with the analysis of metrology results. Many of these approaches involve techniques for improving calculation throughput, such as distributed processing techniques. For example, a master processor can be used that distributes scatterometry calculations among a group of slave processors, such as is described in U.S. Pat. No. 6,704,661, which is hereby incorporated herein by reference. This can be done by as a function of wavelength, for example, so that each slave processor evaluates the theoretical model for selected wavelengths. The other slave processors will carry out the same calculations at different wavelengths. Once complete, the master processor combines the separate calculations and performs the best fit comparison to the empirical results. Based on this fit, the master processor will modify the parameters of the model (e.g. changing the widths or layer thickness) and distribute the calculations for the modified model to the slave processors. This sequence is repeated until a good fit is achieved. Such a distributed processing approach can be used with other types of information, such as with multiple angle of incidence information Techniques of this type can reduce the time required for scatterometry calculations, but as the complexity of the geometry increases the computational complexity requires more than the use of distributed techniques alone.

Another approach used for rapidly evaluating metrology measurements is to use pre-computed libraries of predicted measurements. This type of approach is discussed, for example, in PCT application WO 99/45340, published Sep. 10, 1999, which is hereby incorporated herein by reference. In this approach, a library of expected results is constructed by repeatedly evaluating the theoretical model for range of different parameters. When empirical measurements are obtained, the library is searched to find the best fit. The use of libraries speeds the analysis process by allowing theoretical results to be computed once and reused many times. Of course, libraries are necessarily limited in their resolution and can contain only a finite number of theoretical results. Further, libraries cannot account for changes over time. This means that there are many cases where empirical measurements do not have exact library matches. In these cases, the use of a library represents an undesirable choice between speed and computational accuracy.

In order to overcome this limitation, U.S. Pat. No. 6,768, 967, incorporated herein by reference, describes an approach using a database method of analysis for empirical metrology measurements. The database method is similar to the library approach in that the method relies on a stored set of pre-computed "reflectance characteristics." In this case, however, an interpolation method is used in combination with the database-stored characteristics, making it possible to obtain measurement resolution and accuracy much better than the database sampling resolution. Both the database size and computation time are consequently greatly reduced relative to library-based methods. A critical element of the database interpolation method is the interpolation algorithm itself. Two preferred algorithms are described, namely multi-linear and multi-cubic interpolation. Multi-linear interpolation is very fast, but has poor accuracy. Multi-cubic interpolation is much more accurate, but can be slow, especially when many parameters are being simultaneously measured. In practice, selection of a multi-linear or multi-cubic method is based upon the degree of accuracy and speed required. While this choice may be acceptable when the number of parameters is relatively small, increased speed and accuracy are needed for more complex systems and/or samples.

BRIEF DESCRIPTION OF THE DRAWINGS

FIG. 2 is a diagram of (a) a feed forward process of the prior art and (b) a corresponding MTSA process in accordance with one embodiment of the present invention.

DETAILED DESCRIPTION

Systems and methods in accordance with various embodiments of the present invention can overcome these and other deficiencies in existing approaches to rapidly evaluating multiple data sets, such as sets of optical metrology data, by changing the way in which the data is processed. Multiple Tool and Structure Analysis (MTSA) refers to a parallel regression analysis engine, allowing for the parallel or concurrent application of non-linear regression methodology to multiple data sets, wherein at least one common parameter is coupled during the regressions. MTSA can be an extension of regression algorithms used to process data sets separately, such as algorithms described in U.S. Pat. No. 6,532,076, which is hereby incorporated herein by reference. MTSA can be used in a single structure, multiple-tool version to optimize calculated optical constants, thereby reducing system related errors. These optimized parameters then can later be used to obtain better tool matching performance and calibration optimization.

An MTSA optimization routine can be used for the simultaneous analysis of two or more data sets collected on a single structure, or sample, utilizing multiple measurement and/or metrology tools. MTSA also can be used for a single measurement tool measuring multiple samples, or structures, having one or more parameters that are common between the samples. MTSA also can be used to analyze periodic structures, such as superlattices and optical filters, where those periodic structures will each contain at least one common parameter. MTSA can be used to make multiple measurements of a single structure on a single tool, where at least one parameter value can change between measurements.

Common parameters used for an MTSA process can include tool-specific parameters, such as azimuth angle and/or any calibration parameter such as angle of incidence. Common parameters also can include fitting parameters such as thicknesses, index of refraction, extinction coefficient, line width, sidewall angle, pitch, or other parameters of multiple structures which have the same value, such that an assumption can be made that those parameters are the same for any tool measuring those structures. These common parameters can be defined as global parameters, which can be coupled together between two or more data spaces, such as one data space for each tool or structure. This coupling allows for two parallel regressions that share at least one common (global) parameter. This way, the number of unique parameters for each data set can be minimized by sharing the global parameters between data sets, allowing for fewer parameters to be fit during the regressions.

Rather than processing the data sets separately, or passing common parameters forward to subsequent analyses using a stepwise copy exact parameter feed forward (FFD) approach, MTSA can utilize a parallel computing scheme to process multiple data sets using appropriate parameter globalization to combine parameters for the data sets. MTSA also can utilize the sensitivity of the combined data sets, as discussed elsewhere herein with respect to azimuth angle. In doing so, the MTSA approach can be accomplished in a single step through declaration of global/shared parameters reducing the total number of fitting parameters. This approach can be faster, require less processing capacity, and can be more accurate than the multiple step residual minimization strategy employed by typical FFD approaches. Further, the ability to minimize the number of fitting parameters can help to avoid trade-off problems in the regression analysis as would be known to one of ordinary skill in the art. Approaches to dealing with trade-off problems are discussed, for example, in U.S. Pat. No. 6,532,076, incorporated by reference above.

MTSA processes can be used for any data sets where it is desirable and/or advantageous to perform multiple regression analyses that contain common parameters. Where multiple measurement tools are used to capture different data sets, each tool can have a unique data set that corresponds to a number of tool-specific parameters and/or fitting parameters. Each data set can have parameters that are considered local parameters, which are to be fit for each data set as these parameters are not considered to have substantially identical values between tools. These local parameters are not shared between data sets. Each data set also can have at least one global fitting parameter, which is considered to have substantially identical values between tools (such as the thickness of an underlying layer on a sample being measured by each tool). These global parameters that are shared or coupled between the data sets can be considered to reside in a global data set. By moving these parameters to a global data set, the number of parameters corresponding to the data set for each tool is reduced, thereby reducing the complexity of the regression analysis, or fitting procedure, for each tool.

Global parameters can be coupled/shared using multiplicative or additive coupling constants. Hence, rather than minimizing residuals for the individual data sets, MTSA can minimize a total residual $R_{total}$, which is a function of each residual $R_i$, where i=1 to n, and can be defined as:

$$R_{total} = f(W_1 * R_1 + W_2 * R_2 + \ldots + W_n * R_n)$$

where $W_i$ represents a weighting function for each residual. Furthermore, any kind of measurement choreography can be processed.

Weighting functions can be used for each residual to relate the parameters for each tool. In an ideal case each weighting factor would be 1, allowing for an equal contribution from each residual. If a value of 0 is applied to one of the residuals, that parameter can be excluded from the analysis. If, for example, a second tool is known to provide a less accurate measurement of a parameter than a first tool, such as where the first tool has a higher level of resolution or utilizes a more accurate measurement technique, the second parameter could be fit with a weighting factor of less than 1. This allows the more accurate process to weigh more heavily in the fitting procedure. Weighting factors also can be selected based upon a signal-to-noise ratio for each tool. For instance, different spectrometers will have different levels of pixel to pixel noise, such that a second tool might continually yield a thickness measurement for a top nitride layer that is 90% of the thickness measurement given by the first tool. The use of a weighting function in such a case provides a general solution, allowing the measurement from the first tool to count more than the measurement from the second tool. In one embodiment, each weighting factor for each tool is based on at least two values: the signal-to-noise ratio and the parameter sensitivity. As discussed, weighting factors also allow for the easy removal of a parameter from a model or recipe by simply setting the relevant weighting factor to 0, such as if Tool 3 is turned off or taken out of the process, whereby the same calculation can be made but without the fitting parameters from Tool 3, for example.

Figure 2A:
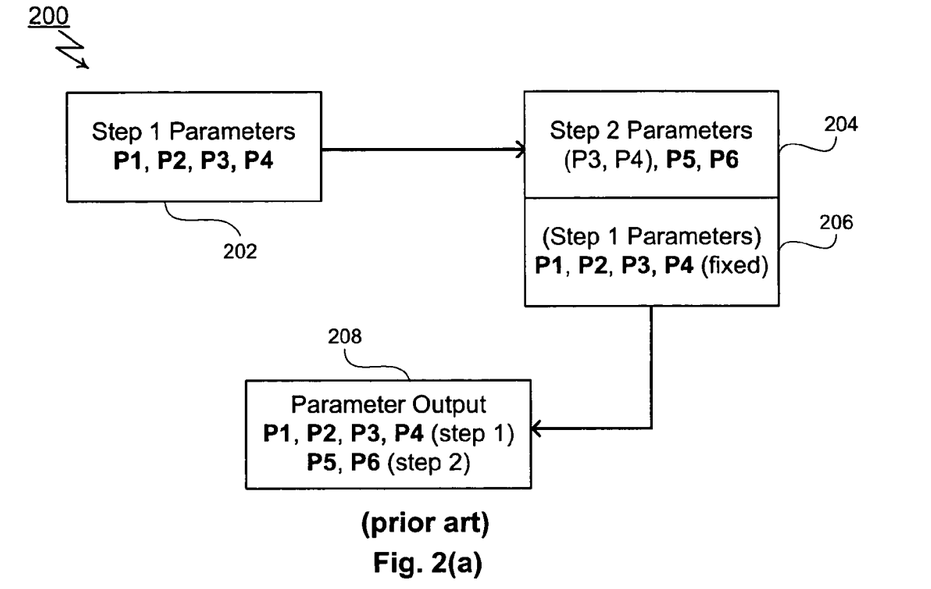

The flowchart of FIG. 2(*a*) demonstrates the parameter flow in an exemplary feed forward (FFD) process 200 used to process multiple data sets. As can be seen, there are four Step 1 Parameters (P1, P2, P3, P4) 202 that can be determined during the Step 1 analysis, which could involve data measured on a first tool or for a first structure. At least some of these Step 1 Parameters, here P3 and P4, are assumed to remain unchanged during subsequent steps, thereby reducing correlation problems. Once the residual of the Step 1 Parameters is minimized and the values of those parameters are determined, these Step 1 Parameters 202 can be passed on, or fed forward, to Step 2, which can utilize data for a measurement on a second tool or structure. As can be seen, there also are four Step 2 Parameters (P3, P4, P5, P6) 204 for which values can be determined. Since the values of P3 and P4 were already determined in Step 1, the fitting algorithm for Step 2 can simply use the fixed, fed forward Step 1 values 206 including P3 and P4 to determine the values of P5 and P6, which can be, for example, new parameters representing increased structural complexity. Using these fixed values for P3 and P4 reduces the number of fitting parameters in the Step 2 regression from four to two. The Output Parameters 208 then would include values for P1, P2, P3, and P4 determined from the Step 1 regression, and values for P5 and P6 determined from the Step 2 regression. This can greatly speed the regression for Step 2, and can reduce the amount of necessary processing capacity and trade-off.

A problem can arise, however, in the fact that there typically is some shift in the measurement values between Step 1 and Step 2, such as where one tool is used for the Step 1 measurement(s) and another tool is used for the Step 2 measurement(s). This shift can lead to inaccurate determinations of P5 and P6 in Step 2 using the values of P3 and P4 as determined in Step 1, as the values of P3 and P4 would have been different had they been determined in a four parameter regression of Step 2. As the parameter values collected on Tool 1 will not be totally valid on Tool 2, the measured parameters for Tool 2 will have an increased margin of error.

Figure 2B:
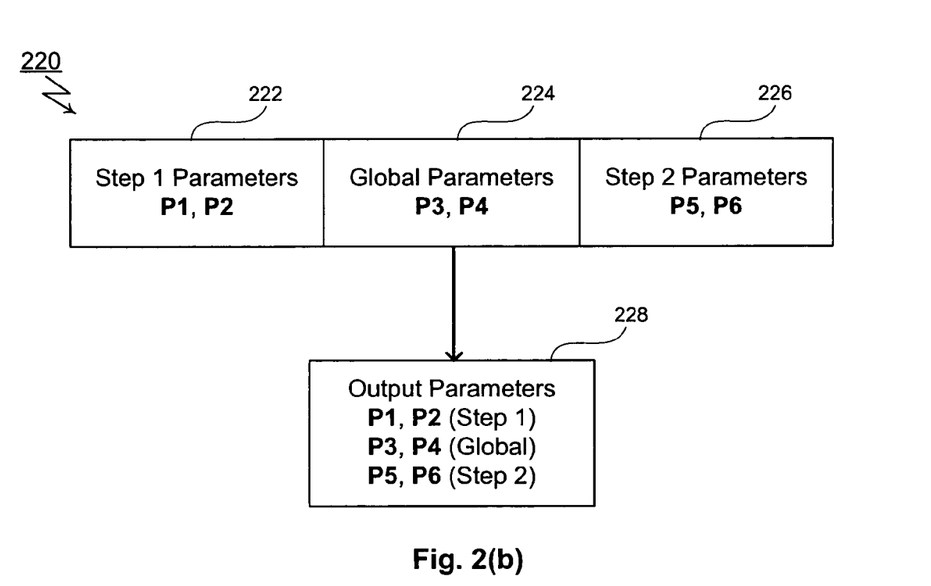

FIG. 2(b) uses the same exemplary parameters as in FIG. 2(a), except this time a MTSA process is used to determine the values of parameters in accordance with one embodiment of the present invention. The MTSA solution can provide a more generalized solution, as the processes are not done in a stepwise fashion, but in parallel, with the assumption that that the global parameters are the identical and can be fit at the same time. Here, the two data sets (or data spaces) each correspond to the local parameters for the respective tool or structure, with the Step 1 Parameters 222 including P1 and P2 for measurements on Tool 1, for example, and the Step 2 Parameters 224 including P5 and P6 for measurements on Tool 2. It should be understood that these Step Parameters could correspond to other data, such as multiple structures measured on the same tool. Since each tool can measure values for parameters P3 and P4, but the values of P3 and P4 should not actually change between tools, P3 and P4 can be designated as global or shared parameters 226. As discussed elsewhere herein, the regression model can be adjusted so that the values obtained for P3 and P4 are accurate for each tool to within an acceptable amount, such as within the specifications of the fabrication process. By defining P3 and P4 as Global Parameters, the regressions done for the Step 1 Parameters and Step 2 Parameters are each reduced to two fitting parameters instead of four. A residual minimization then can be done in a single step by simultaneously minimizing the residuals for P1 and P2 for the Step 1 Parameters and the residuals for P5 and P6 for the Step 2 Parameters. The set of Output Parameters 228 then includes P1 and P2 determined from a regression on the Step 1 Parameters, P5 and P6 determined from a regression on the Step 2 Parameters, and the Common Global values for P3 and P4 that are shared in each regression. This not only reduces the time and processing capacity needed for the regressions, but reduces the likelihood for parameter tradeoff problems and correlation issues that can arise if there are too many fitting parameters and/or too little measurement data. The reduction in the number of fitting parameters also can reduce the uncertainty in the determined value of each local parameter.

When using global parameters, the assumption is that the values of these global parameters are substantially identical between the sets of Step Parameters. For instance, if a wafer is in one instance measured with a layer of nitride on a layer of oxide on silicon, and in another instance measured with just oxide on silicon, it can be assumed for certain processes that the oxide in both instances has the same thickness and refractive index. Ideally, the only difference(s) between the two sets of Step Parameters should be due to the presence of the nitride layer. The global parameters in this example then can be the thickness and the index of the oxide layer. When fitting for the thickness of the nitride layer, then, the number of fitting parameters is reduced for the amount of available data, easing the regression and providing for more accurate results.

Figure 3:
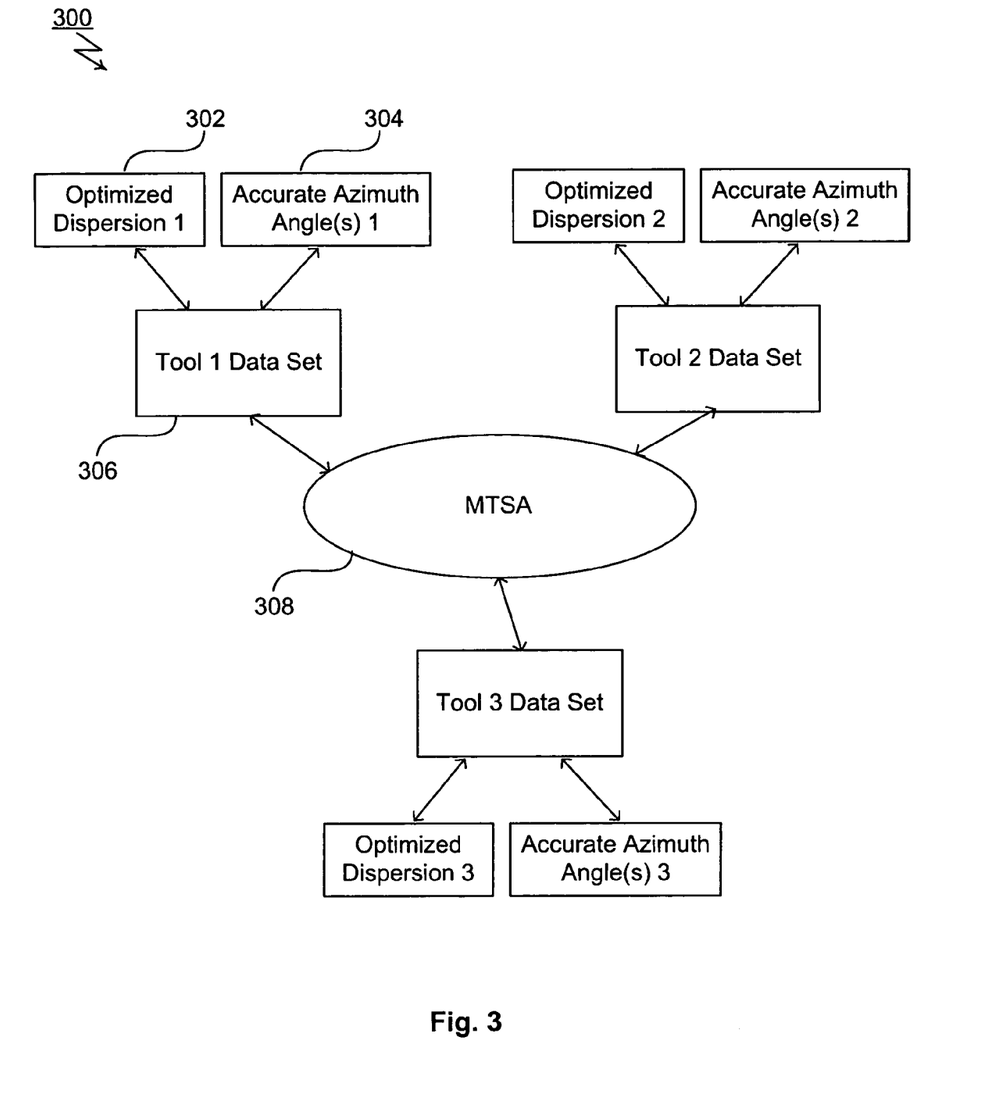
FIG. 3 is a diagram showing data flow in an exemplary MTSA process in accordance with one embodiment of the present invention.

An example of how an MTSA might be used with a multi-tool metrology system will be described with respect to FIGS. 3 and 4. While the application is discussed with respect to metrology, it should be understood that such an MTSA approach can have application to any process whereby two or more data sets share at least one common parameter such that making that common parameter a global parameter can simplify the regression for each data set. For instance, MTSA could be used with any of the processes described in U.S. Pat. No. 6,532,076, hereby incorporated herein by reference. Global parameters can be associated with shared physical features or properties of the structure(s) being examined, whether in a single tool or multiple tools, thereby reducing the total number of fitting parameters processed using an MTSA engine.

Before doing any regression or modeling, the parameters being measured for each tool or structure can be determined, such that parameters with common values across each tool can be selected as global parameters where such selection will ease the regression analysis. For example, in a metrology system using multiple measurement tools to measure features and/or layers on a semiconductor device during fabrication, it can be determined that a system specific parameter can be set as a global parameter when fitting for each tool.

As discussed above, the azimuth angle can vary slightly between tools, as well as between light sources in a single tool. For example, a first tool might have an azimuth angle that is about 1 degree off with respect to the azimuth angle of a second tool. In another example, a scatterometry tool might use a first light source to produce a probe beam over the visible spectrum, and a second light source to produce a probe beam over the ultraviolet (UV) spectrum. Even though every effort might be made to align the probe beams such that the beams impinge upon the sample at the same azimuth angle, or angle relative to a normal of the sample, there can still be some variation due to slight alignment differences and/or changes over time. This leads to the presence of two slightly different azimuth angles within the same tool. One way to determine the azimuth angle for each probe beam is to capture a data set for each light source using a common and simple structure, and perform a regression analysis on data for each source. In order to obtain accurate results, it can be desirable to use a sample that provides an optimal sensitivity for these measurements. In one approach, a poly gate structure can be used which has a greater sensitivity toward the visible and/or IR spectrum and provides accurate measurements for a visible and/or IR source. A VLSI structure can also be measured which has a larger sensitivity in the UV spectrum, providing better accuracy for the UV source. Once the data is captured, an MTSA process can be used to analyze this data to provide an accurate UV azimuth angle and an accurate IR azimuth angle. One way to determine the values is to fit only on azimuth angle, while defining the other measurement parameters, such as the CD and trench depth, as global or shared parameters, such that the only variables leading to measurement differences are the azimuth angles. In this way the azimuth angles can be fit independently in order to get the best azimuth angle parameter value for each tool or each source. Once the azimuth angles are obtained for each source and/or tool, these azimuth angles can be kept fixed for later measurements and regressions.

Since knowledge of the azimuth angle is critical for many OCD applications, and the hardware specific parameter is generally difficult to obtain using conventional hardware based methods, a model-based approach using appropriate structures is of advantage. If the azimuth angles are within a predetermined tolerance or specification, a single azimuth angle can be defined that can be used for each light source. If the angles are outside specification, or sufficiently different to warrant the tracking of separate values, then the separate angles can be used for separate wavelength ranges.

An MTSA procedure also can be used to optimize the dispersion for each tool. The multiple tool analysis can be used to simultaneously process and develop the dispersions using data collected on all the tools, therefore avoiding small but significant tool-to-tool distortions in the derived optical constants. Tool-to-tool differences in the dispersions typically are caused by such factors as the calibration of each tool and the signal-to-noise ratio of the tool. Since the dispersion is a physical property of a material, however, the dispersion value of an oxide or nitride layer, for example, should not change based upon the tool. It therefore can be desirable to optimize the dispersion reading by sufficiently removing influences due to tool-to-tool differences. For example, a critical point model can be applied to data from several tools, where all the critical point model parameters will be global parameters in order to obtain a more general data set Once the azimuth angle is obtained and the dispersions are optimized, MTSA can be used for a tool matching procedure 300. FIG. 3 shows that each tool a data set 306 having an optimized dispersion 302 (the optimized dispersion is identical for each tool as discussed above) and an accurately characterized azimuth angle 304. These values can be used as inputs for tool matching in order to optimize a recipe that, when put on the systems, will provide results that are accurate, to within specification, for each system. For example, it can be desirable to optimize a metrology system such that the middle critical dimension (CD) for a semiconductor device measured on each tool is within 1 nm of variation. The middle CD dimension as used herein refers to half-height measurement of the critical dimension. The data for each tool can be fed into an MTSA engine 308, whereby the system can attempt to optimize the recipe by minimizing the residual.

Figure 4:
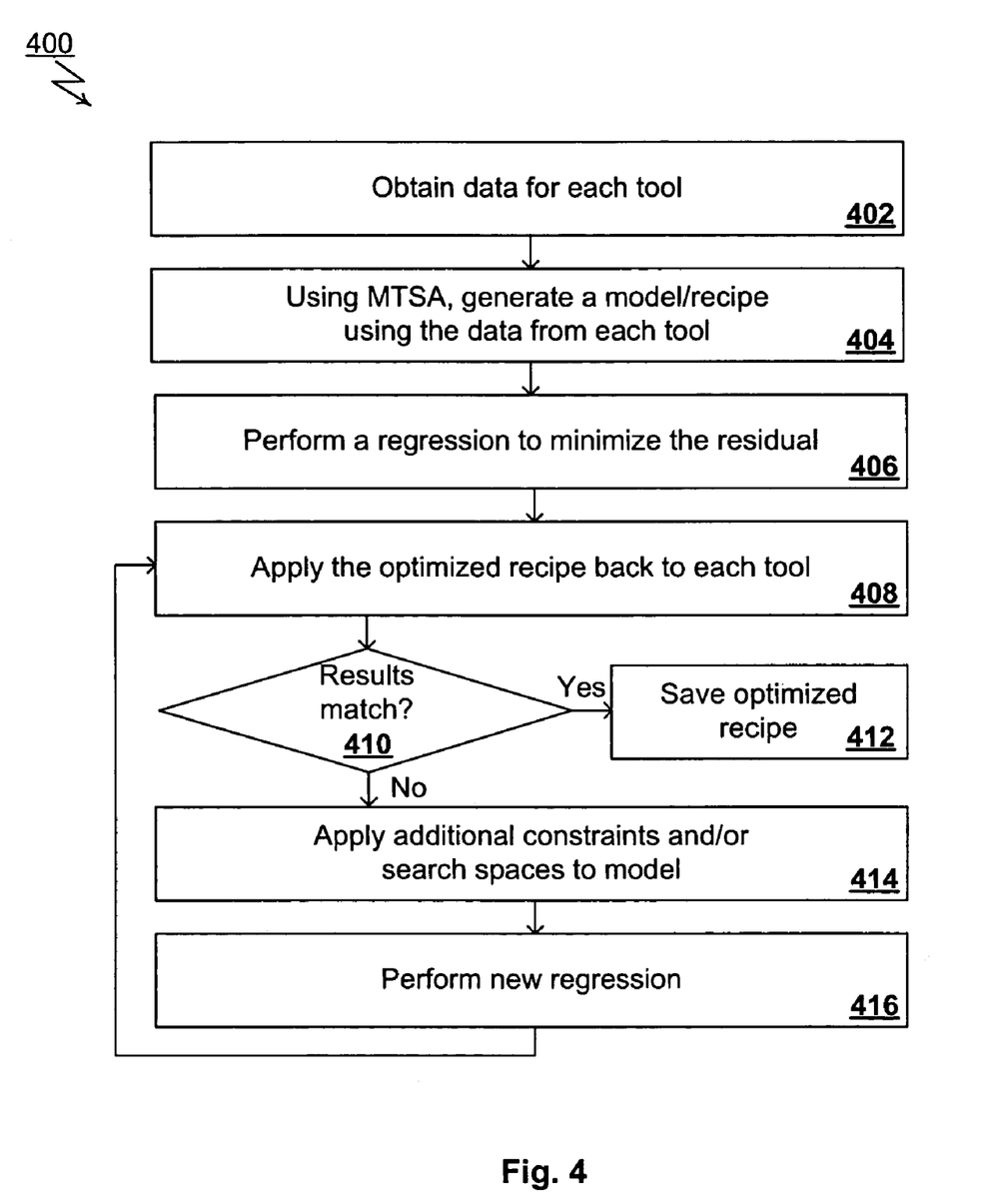
FIG. 4 is a flowchart showing an MTSA process in accordance with one embodiment of the present invention.

One such tool matching process is shown in FIG. 4. In this exemplary process 400, a data set is obtained for each tool 402. As discussed with respect to FIG. 3, this can involve in one example obtaining optimized dispersion values and system-specific azimuth angles using different MTSA features. MTSA then can be used to generate a model using the data from each tool 404, such as by setting the dispersion for each tool as a global parameter and the azimuth angle as a local fitting parameter. An initial solution can be found by performing a regression to minimize the residual of the overall recipe for the system 406. This may require defining constraints and/or using multiple search grids or search intervals, whereby an attempt is made to find a solution by stepping over a new range using a specified number of values in that range. Once minimized, this initial recipe then can be applied to the data set for each tool 408, and a determination can be made whether the results for each tool as well as between tools, are within specification 410. This determination can be necessary, as minimizing the residual of the overall recipe does not necessarily mean that the systems are matched. It can be necessary to apply the "optimized" recipe to each tool individually and examine the results to see if the numbers agree. For instance, the tools can be said to be matched if the differences in measurement of the middle CD from each tool is within 1 nm. The recipe can also be examined to see if the recipe gives an accurate result for the azimuth angle(s) of each tool, within specification, as determined previously. The process can also determine whether the model predicts the value of the dispersion that is accurate for each tool, as well as providing an acceptable amount of agreement between tools. The results for various parameters can be shifted by some amount due to the calculation attempting to use the calibrations from all the tools to optimize data on specific tools. The individual tool calculations can attempt to drag the parameter value toward the value for that particular tool, due to differences in calibration, etc. If the tools are matched to within specification, this optimized recipe can be used for system metrology 412. If the tools are not matched to within specification, the minimum residual solution did not provide an optimal matching solution, such that it can be necessary to apply additional constraints and/or search spaces to the model 414, and perform another regression 416. This optimization process can continue, changing the constraints and search spaces and performing additional regressions, until the tools are matched to within specification and an optimized recipe is obtained 412. Each optimization process can continue until the values are within specification, or when the process has tried all values within the search space, at which point the iterative optimization process will output the best possible solution given the search space and constraints. The user then can choose to do another grid search based on another parameter, etc. This process can provide an automatic way to match the systems.

When determining whether the optimized recipe produces an appropriate result on each tool individually in this example, the azimuth angles can be fixed. The recipe can be applied to Data Set 1, for example, by setting the weighting factor for residual 1 to $W_1=1$, while setting the other residuals to 0, such that only the first residual is fit during the regression. Each recipe alternative can be implemented on individual data sets one by one. The search can be continued when the constraints or matching limits are not fulfilled. The range of a search interval can be defined by a minimum, a maximum, and a number of steps. The search intervals and steps can be different for each tool. Examples of search parameters can include wavelength range, step size, spline option, pitch, measurement angle, and number of orders.

In additional to analyzing multiple structures on a single tool, or a single structure on multiple tools, advantages can be obtained by using an MTSA process with a single structure on a single tool, as well as multiple structures on multiple tools. For example, multiple azimuth angle measurements can be made of a single structure on a single tool having a single light source. In the MTSA process the azimuth angles can be set to be the local parameters, with all the other parameters being set as global parameters. Such an approach can increase the amount of available data and structure sensitivity, while reducing trade-off problems. Using multiple azimuth angles to analyze a thin film, for example, is similar to analyzing the film using multiple angles of incidence, as known in the art.

Although embodiments described herein are in the context of specific search algorithms, an MTSA approach also can be applied to other iterative search algorithms where multiple data sets can be processed in parallel by combining common parameters between data sets. These processes also are not limited to the fields of metrology or semiconductor processing, but can be used in any appropriate field in which data is collected and/or stored.

It should be recognized that a number of variations of the above-identified embodiments will be obvious to one of ordinary skill in the art in view of the foregoing description. Accordingly, the invention is not to be limited by those specific embodiments and methods of the present invention shown and described herein. Rather, the scope of the invention is to be defined by the following claims and their equivalents.

What is claimed is:

1. A method for analyzing a sample, comprising the steps of:
   optically measuring a sample on a first tool to obtain a first data set corresponding to a number of first parameters;
   optically measuring the sample on a second tool to obtain a second data set corresponding to a number of second parameters;
   selecting at least one common parameter for each of the first and second data sets, the common parameter having a substantially identical value for both the first and second data sets;
   selecting a mathematical model for the sample;
   performing in parallel a regression analysis on each of the first and second data sets using the mathematical model to obtain a first solution, wherein during the regression, the values of the first and second parameters are varied with the value selected for the common parameter being shared in order to minimize the number of fitting parameters in each regression analysis; and
   storing the first solution.

2. A method according to claim 1, wherein:
   the step of performing in parallel a regression analysis on each of the first and second data sets includes minimizing a residual for each regression analysis.

3. A method according to claim 1, further comprising:
   applying the first solution back to each of the first and second tools to determine whether the first solution provides an accurate value for each of the first and second parameters to within a desired specification.

4. A method according to claim 3, further comprising:
   altering the mathematical model, by at least one of applying an additional constraint and changing a search space, for at least one of the first and second parameters for which the first solution does not provide an accurate value to within the desired specification; and
   performing in parallel a subsequent regression analysis on each of the first and second data sets in order to obtain a second solution.

5. A method according to claim 4, further comprising:
   applying the second solution back to each of the first and second data sets to determine whether the second solution provides an accurate value for each of the first and second parameters to within a desired specification.

6. A method according to claim 1, wherein:
   the step of performing in parallel a regression analysis on each of the first and second data sets can include performing in parallel a regression analysis on additional data sets, wherein each additional data set includes the at least one global parameter.

7. A method according to claim 1, wherein:
   at least one of the first parameters and second parameters includes a parameter selected from the group consisting of thickness, refractive index, azimuth angle, extinction coefficient, dispersion, scattering, crystallinity, and composition.

8. A method according to claim 1, wherein:
   the mathematical model includes a weighting function for each of the first and second parameters.

9. A method for analyzing a sample, comprising the steps of:
   optically measuring a first structure on a metrology tool to obtain a first data set corresponding to a number of first parameters;
   optically measuring a second structure on the metrology tool to obtain a second data set corresponding to a number of second parameters, the first and second structures including at least one common structural component;
   selecting at least one common parameter for each of the first and second data sets, the common parameters having a substantially identical value for both the first and second data sets;
   selecting a mathematical model for the first and second structures;
   performing in parallel a regression analysis on each of the first and second data sets using the mathematical model to obtain a first solution, wherein during the regression, the values of the first and second parameters are varied with the value selected for the common parameter being shared in order to minimize the number of fitting parameters in each regression analysis; and
   storing the first solution.

10. A method according to claim 9, wherein:
    the step of performing in parallel a regression analysis on each of the first and second data sets includes minimizing a residual for each regression analysis.

11. A method according to claim 9, further comprising:
    applying the first solution back to each of the first and second structures to determine whether the first solution provides an accurate value for each of the first and second parameters to within a desired specification.

12. A method according to claim 11, further comprising:
    altering the mathematical model, by at least one of applying an additional constraint and changing a search space, for at least one of the first and second parameters for which the first solution does not provide an accurate value to within the desired specification; and
    performing in parallel a subsequent regression analysis on each of the first and second data sets in order to obtain a second solution.

13. A method according to claim 12, further comprising:
    applying the second solution back to each of the first and second data sets to determine whether the second solution provides an accurate value for each of the first and second parameters to within a desired specification.

14. A method according to claim 9, wherein:
    the step of performing in parallel a regression analysis on each of the first and second data sets can include performing in parallel a regression analysis on additional data sets, wherein each additional data set includes the at least one global parameter.

15. A method according to claim 9, wherein:
    at least one of the first parameters and second parameters includes a parameter selected from the group consisting of thickness, refractive index, azimuth angle, extinction coefficient, dispersion, scattering, crystallinity, and composition.

16. A method according to claim 9, wherein:
    the mathematical model includes a weighting function for each of the first and second parameters.

17. A system for analyzing a sample, comprising:
    a source of radiation for illuminating the sample;

a detection device for receiving radiation reflected from the sample and providing an output signal in response thereto; and a processor for receiving the output signal, the processor having instructions for:

obtaining a first data set corresponding to a number of first parameters for a first structure;

obtaining a second data set corresponding to a number of second parameters for a second structure, the first and second structures including at least one common structural component;

selecting at least one common parameter for each of the first and second data sets, the common parameter having a substantially identical value for both the first and second data sets;

performing in parallel a regression analysis on each of the first and second data sets using a mathematical model to obtain a first solution, wherein during the regression, the values of the first and second parameters are varied with the value selected for the common parameter being shared in order to minimize the number of fitting parameters in each regression analysis.

18. A system according to claim 17, wherein:

the source of radiation includes at least one source of radiation in the range of at least one of visible, infrared, and ultraviolet radiation.

19. A system according to claim 17, wherein:

the first and second structures are formed on a single semiconductor substrate.

20. A system according to claim 17, wherein:

the processor further includes instructions for applying the first solution back to each of the first and second data sets to determine whether the first solution provides an accurate value for each of the first and second parameters to within a desired specification.

21. A system according to claim 20, wherein:

the processor further includes instructions for altering the mathematical model, by at least one of applying an additional constraint and changing a search space, for at least one of the first and second parameters for which the first solution does not provide an accurate value to within the desired specification, and performing in parallel a subsequent regression analysis on each of the first and second data sets in order to obtain a second solution.

22. A system according to claim 21, wherein:

the processor further includes instructions for applying the second solution back to each of the first and second data sets to determine whether the second solution provides an accurate value for each of the first and second parameters to within a desired specification.

23. A system for analyzing a sample, comprising:

a first measurement tool including a first source of radiation for illuminating the sample and a first detection device for receiving radiation reflected from the sample and providing a first output signal in response thereto;

a second measurement tool including a second source of radiation for illuminating the sample and a second detection device for receiving radiation reflected from the sample and providing a second output signal in response thereto; and a processor for receiving the first and second output signals, the processor having instructions for:

obtaining a first data set corresponding to a number of first parameters for the sample measured using the first measurement tool;

obtaining a second data set corresponding to a number of second parameters for the sample measured using the second measurement tool;

selecting at least one common parameter for each of the first and second data sets, the common parameter having a substantially identical value for both the first and second data sets;

performing in parallel a regression analysis on each of the first and second data sets using a mathematical model to obtain a first solution, wherein during the regression, the values of the first and second parameters are varied with the value selected for the common parameter being shared in order to minimize the number of fitting parameters in each regression analysis.

24. A system according to claim 23, wherein:

the processor further includes instructions for applying the first solution back to each of the first and second data sets to determine whether the first solution provides an accurate value for each of the first and second parameters to within a desired specification.

25. A system according to claim 24, wherein:

the processor further includes instructions for altering the mathematical model, by at least one of applying an additional constraint and changing a search space, for at least one of the first and second parameters for which the first solution does not provide an accurate value to within the desired specification, and performing in parallel a subsequent regression analysis on each of the first and second data sets in order to obtain a second solution.

26. A system according to claim 25, wherein:

the processor further includes instructions for applying the second solution back to each of the first and second data sets to determine whether the second solution provides an accurate value for each of the first and second parameters to within a desired specification.

27. A method for analyzing multiple data sets, comprising the steps of:

obtaining a first data set corresponding to a number of first parameters;

obtaining a second data set corresponding to a number of second parameters;

selecting at least one common parameter for each of the first and second data sets, the common parameter having a substantially identical value for both the first and second data sets;

selecting a mathematical model for the first and second data sets;

performing in parallel a regression analysis on each of the first and second data sets using the mathematical model to obtain a first solution, wherein during the regression, the values of the first and second parameters are varied with the value selected for the common parameter being shared in order to minimize the number of fitting parameters in each regression analysis; and storing the first solution.

28. A method according to claim 27, further comprising:

applying the first solution back to each of the first and second data sets to determine whether the first solution provides an accurate value for each of the first and second parameters to within a desired specification.

29. A method according to claim 28, further comprising:

altering the mathematical model, by at least one of applying an additional constraint and changing a search space, for at least one of the first and second parameters for which the first solution does not provide an accurate value to within the desired specification; and performing in parallel a subsequent regression analysis on each of the first and second data sets in order to obtain a second solution.

30. A method according to claim 29, further comprising:
applying the second solution back to each of the first and second data sets to determine whether the second solution provides an accurate value for each of the first and second parameters to within a desired specification.

* * * * *